United States Patent [19]

Mory et al.

[11] 4,031,073
[45] June 21, 1977

[54] MONOAZO PIGMENTS CONTAINING BARBITURIC ACID OR THIO- OR IMINO-DERIVATIVES THEREOF

[75] Inventors: Rudolf Mory, Dornach; Stefan Hari, Allschwil, both of Switzerland

[73] Assignee: Ciba-Geigy Corporation, Ardsley, N.Y.

[22] Filed: Nov. 25, 1975

[21] Appl. No.: 635,210

Related U.S. Application Data

[63] Continuation-in-part of Ser. No. 489,277, July 17, 1974, abandoned.

[30] Foreign Application Priority Data

July 27, 1973 Switzerland .................... 10997/73

[52] U.S. Cl. .............................. 260/154; 106/23; 106/288 Q; 106/308 Q; 260/37 R; 260/37 N; 260/37 NP; 260/39 P; 260/40 R; 260/42.21; 260/208; 260/140; 260/256.4 C; 260/256.4 N; 260/257; 260/260; 260/558 A

[51] Int. Cl.² ................ C09B 29/36; C09D 11/00; D06P 1/08; D06P 3/00

[58] Field of Search .............. 260/155, 146 R, 156, 260/154

[56] References Cited

UNITED STATES PATENTS

| | | |
|---|---|---|
| 2,103,269 | 12/1937 | McNally et al. ............... 260/154 X |
| 2,130,358 | 9/1938 | McNally et al. ............... 260/154 X |
| 2,140,538 | 12/1938 | McNally et al. ............... 260/154 X |
| 2,140,539 | 12/1938 | McNally et al. ............... 260/154 X |
| 2,746,951 | 5/1956 | Taube ............................. 260/154 |

*Primary Examiner*—Floyd D. Higel
*Attorney, Agent, or Firm*—Vincent J. Cavalieri

[57] ABSTRACT

Monoazo pigments of the formula

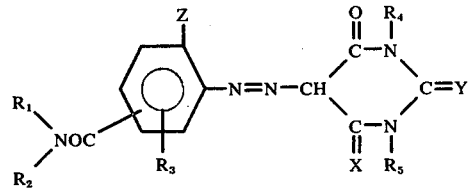

wherein $R_1$ denotes a H atom, an alkyl group containing 1–4 C atoms or an aryl radical, $R_2$ denotes a H atom, an alkyl group containing 1–4 C atoms, or an aralkyl or aryl radical, or wherein the radicals $R_1$ and $R_2$, conjointly with the N atom, form a heterocyclic 5-membered or 6-membered ring, $R_3$ denotes an H atom or halogen atom or an alkyl group containing 1–4 C atoms, $R_4$ and $R_5$ denote H atoms, alkyl groups containing 1–4 C atoms or phenyl groups optionally substituted by halogen atoms and alkyl and alkoxy groups containing 1–4 C atoms, X denotes an O atom or an imino group, Y denotes an O atom or S atom or an imino group, and Z denotes a halogen atom, an alkyl or alkoxy group containing 1–4 C atoms, or an aryloxy group, and wherein the carbonamide group is located in the m- or p-position to the azo group are prepared. The compounds are useful for coloring high molecular organic materials such as aminoplast, alkyl resins, polystyrene and polyvinyl chloride. The pigments show very good fastness to light and migration.

9 Claims, No Drawings

MONOAZO PIGMENTS CONTAINING BARBITURIC ACID OR THIO- OR IMINO-DERIVATIVES THEREOF

This is a continuation-in-part of our copending application Ser. No. 489,277, filed July 17, 1974 now abandoned.

It has been found that new, valuable monoazoa pigments of the formula

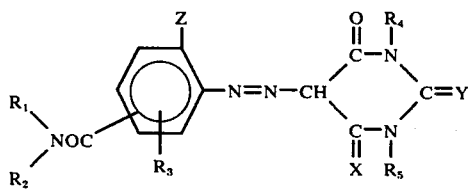

wherein $R_1$ denotes a H atom, an alkyl group containing 1–4 C atoms or an aryl radical, $R_2$ denotes a H atom, an alkyl group containing 1–4 C atoms, or an aralkyl or aryl radical, or wherein the radicals $R_1$ and $R_2$, conjointly with the N atom, form a heterocyclic 5-membered or 6-membered ring, $R_3$ denotes a H atom or halogen atom or an alkyl group containing 1–4 C atoms, $R_4$ and $R_5$ denote H atoms, alkyl groups containing 1–4 C atoms or phenyl groups optionally substituted by halogen atoms or alkyl or alkoxy groups having 1–4 C atoms, X denotes an O atom or an imino group, Y denotes an O atom or S atom or an imino group, and Z denotes a halogen atom, an alkyl or alkoxy group containing 1–4 C atoms or an aryloxy group, and wherein the carbonamide group is located in the m- or p-position to the azo group, are obtained if the diazo or diazoamino compound of an amine of the formula

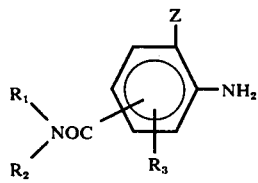

is coupled with a diazine of the formula

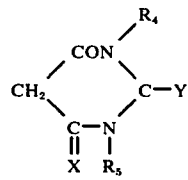

Pigments of particular interest are those of the formula

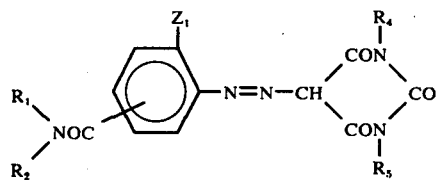

wherein $R_1$, $R_2$, $R_3$ and $R_4$ have the meaning indicated and $Z_1$ denotes a chlorine atom, an alkyl or alkoxy group containing 1–4 C atoms or a phenoxy group optionally substituted by halogen atoms or an alkyl or alkoxy group containing 1–4 C atoms, and particularly those of the formulae

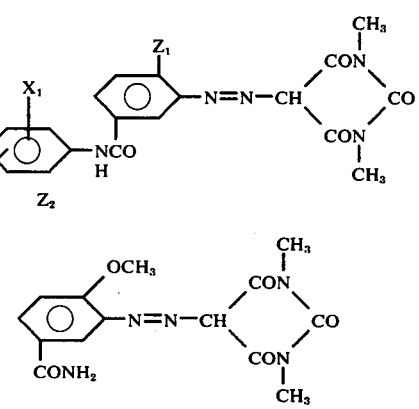

wherein $Z_1$ has the meaning indicated, but particularly denotes an alkoxy group containing 1–4 C atoms, $X_1$ denotes a H atom or halogen atom, an alkyl of alkoxy group containing 1–4 C atoms, an alkoxycarbonyl group containing 2–5 atoms, or a nitro, trifluoromethyl or nitrile group, and $Y_1$ and $Z_2$ denote H atoms or halogen atoms or alkyl groups containing 1–4 C atoms.

The diazo components used are preferably amines of the formula

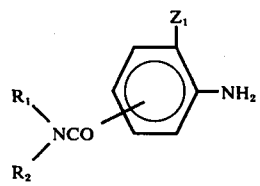

wherein $R_1$, $R_2$ and $Z_1$ have the meaning indicated, and particularly amines of the formulae

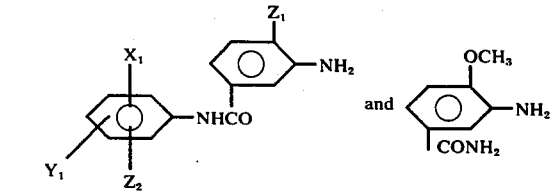

wherein $X_1$, $Y_1$, $Z_1$ and $Z_2$ have the meaning indicated.

The following diazo components may be mentioned as examples: 1-amino-2-chlorobenzene-4-carboxylic acid amide, 1-amino-2-chlorobenzene-4-carboxylic acid methylamide, 1-amino-2-chlorobenzene-4-carboxylic acid dimethylamide, 1-amino-2-chlorobenzene-4-carboxylic acid diethylamide, 1-amino-2-chlorobenzene-4-carboxylic acid phenylamide, 1-amino-2-chlorobenzene-5-carboxylic acid dimethylamide, 1-amino-2-chlorobenzene-5-carboxylic acid diethylamide, 1-amino-2-chlorobenzene-5-carboxylic acid morpholide, 1-amino-2-chlorobenzene-5-carboxylic acid phenylamide, 1-amino-2,5-dichlorobenzene-4-carboxylic acid amide, 1-amino-2,5-dichlorobenzene-4-carboxylic acid dimethylamide, 1-amino-2,5-dichlorobenzene-4-carboxylic acid phenylamide, 1-amino-2,4-dichlorobenzene-5-carboxylic acid phenylamide, 1-amino-2,4-dichlorobenzene-5-carboxylic acid 4'-chloro-2'-methylphenylamide, 1-amino-2,4-dichlorobenzene-5-carboxylic acid 2'-chloro-5'-trifluoromethylphenylamide, 1-amino-2-methylbenzene-5-carboxylic acid amide, 1-amino-2-methylbenzene-5-carboxylic acid methylamide, 1-amino-2-methylbenzene-5-carboxylic acid dimethylamide, 1-amino-2-methylbenzene-5-carboxylic acid phenylamide, 1-amino-2-methylbenzene-5-carboxylic acid piperidide, 1-amino-2-methylbenzene-5-carboxylic acid benzylamide, 1-amino-2-methylbenzene-5-carboxylic acid N-methyl-N-phenylamide, 1-amino-2-methylbenzene-5-carboxylic acid 2'-chlorophenylamide, 1-amino-2-methylbenzene-5-carboxylic acid 4'-chlorophenylamide, 1-amino-2-methylbenzene-5-carboxylic acid 2',4'-dichlorophenylamide, 1-amino-2-methylbenzene-5-carboxylic acid 2'-methylphenylamide, 1-amino-2-methylbenzene-5-carboxylic acid 4'-methylphenylamide, 1-amino-2-methylbenzene-5-carboxylic acid 4'-methoxyphenylamide, 1-amino-2-methylbenzene-5-carboxylic acid 4'-chloro-2'-methylphenylamide, 1-amino-2-methylbenzene-5-carboxylic acid 4'-chloro-3'-methylphenylamide, 1-amino-2-methylbenzene-5-carboxylic acid 3'-trifluoromethylphenylamide, 1-amino-2-methylbenzene-4-carboxylic acid 4'-chloro-2'-methylphenylamide, 1-amino-2-methylbenzene-4-carboxylic acid 4'-phenyl-phenylamide, 1-amino-2-methylbenzene-4-carboxylic acid dimethylamide, 1-amino-2-methylbenzene-4-carboxylic acid diethylamide, 1-amino-3-methylbenzene-4-carboxylic acid dimethylamide, 1-amino-2-methylbenzene-4-carboxylic acid phenylamide, 1-amino-4-methylbenzene-5-carboxylic acid amide, 1-amino-4-methylbenzene-5-carboxylic acid dimethylamide, 1-amino-2-methoxybenzene-4-carboxylic acid amide, 1-amino-2-methoxybenzene-4-carboxylic acid methylamide, 1-amino-2-methoxybenzene-4-carboxylic acid dimethylamide, 1-amino-2-methoxybenzene-4-carboxylic acid phenylamide, 1-amino-2-methoxybenzene-4-carboxylic acid 4'-methylphenylamide, 1-amino-2-methoxybenzene-5-carboxylic acid amide, 1-amino-2-methoxybenzene-5-carboxylic acid dimethylamide, 1-amino-2-methoxybenzene-5-carboxylic acid phenylamide, 1-amino-2-phenoxybenzene-4-carboxylic acid amide, 1-amino-2-phenoxybenzene-4-carboxylic acid dimethylamide, 1-amino-2-phenoxybenzene-4-carboxylic acid phenylamide, 1-amino-2-phenoxybenzene-5-carboxylic acid amide, 1-amino-2-phenoxybenzene-5-carboxylic acid dimethylamide, 1-amino-2-phenoxybenzene-5-carboxylic acid phenylamide, 1-aminobenzene-4-carboxylic acid 3'-trifluoromethylphenylamide, 1-aminobenzene-4-carboxylic acid 2'-chlorophenylamide, 1-aminobenzene-4-carboxylic acid 2'-methyl-5'-chlorophenylamide, 1-aminobenzene-3-carboxylic acid amide, 1-amino-2-methoxybenzene-5-carboxylic acid 2'-methyl-5'-chlorophenylamide, 1-amino-2-methoxybenzene-5-carboxylic acid 2'-methyl-3'-chlorophenylamide, 1-amino-2-methoxybenzene-5-carboxylic acid 2'-chloro-5'-trifluoromethylphenylamide, 1-amino-2-methoxybenzene-5-carboxylic acid 2',5'-dichlorophenylamide, 1-amino-2-chlorobenzene-5-carboxylic acid 2',4'-dichlorophenylamide, 1-amino-2-chlorobenzene-5-carboxylic acid 2'-chlorophenylamide, 1-amino-2-chlorobenzene-5-carboxylic acid 2'-chloro-5'-methoxycarbonylphenylamide, 1-amino-2-chlorobenzene-5-carboxylic acid 2'-methylphenylamide, 1-amino-2-chlorobenzene-5-carboxylic acid 3'-trifluoromethylphenylamide, 1-amino-2-chlorobenzene-5-carboxylic acid 2'-chloro-5'-trifluoromethylphenylamide, 1-amino-2-chlorobenzene-5-carboxylic acid 2'-methyl-3'-chlorophenylamide, 1-amino-2-chlorobenzene-5-carboxylic acid 2'-methyl-5'-chlorophenylamide, 1-amino-2-methylbenzene-5-carboxylic acid 2',5'-dichlorophenylamide, 1-amino-2-methylbenzene-5-carboxylic acid 2',5'-dichlorophenylamide, 1-amino-2-methylbenzene-5-carboxylic acid 3'-chlorophenylamide, 1-amino-2-methylbenzene-5-carboxylic acid 2'-chloro-5'-trifluoromethylphenylamide, 1-amino-2-methylbenzene-5-carboxylic acid 2'-methoxyphenylamide, 1-amino-2-methylbenzene-5-carboxylic acid 2'-trifluoromethyl-4'-chlorophenylamide, 1-amino-2-methylbenzene-3-carboxylic acid 2'-methylphenylamide, 1-amino-2-methylbenzene-3-carboxylic acid 3',4'-dichlorophenylamide, 1-amino-2-methylbenzene-3-carboxylic acid 2',4',5'-trichlorophenylamide, 1-amino-2-methylbenzene-3-carboxylic acid 3'-trifluoromethylphenylamide, 1-amino-2-methylbenzene-3-carboxylic acid 4'-phenylphenylamide, 1-amino-2-ethoxybenzene-5-carboxylic acid 3'-chlorophenylamide, 1-amino-2-ethoxybenzene-5-carboxylic acid 4'-methylphenylamide, 1-amino-2-ethoxybenzene-5-carboxylic acid 2'-methyl-5'-chlorophenylamide, 1-amino-2-phenoxybenzene-5-carboxylic acid 2',5'-dimethylphenylamide, 1-amino-2-phenoxybenzene-5-carboxylic acid 2'-chloro-5'-trifluoromethylphenylamide, 1-amino-2-(4''-chlorophenoxy)-benzene-5-carboxylic acid 2'-chlorophenylamide, 1-amino-2-(4''-chlorophenoxy)-benzene-5-carboxylic acid amide and 1-amino-2-(4''-chlorophenoxy)-benzene-5-carboxylic acid 3'-nitrophenylamide.

The diazo components mentioned are known compounds.

Barbituric acid may be mentioned particularly as a coupling component; in addition, the functional derivates thereof can also be used, for example N-methyl-, N,N-dimethyl-, N-ethyl-, N,N-dialkyl-, N-phenyl- or N,N-diphenyl-barbituric acid as well as the thio- or imino-derivaties thereof of the formula

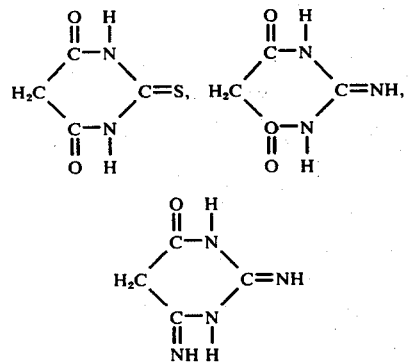

These barbituric acid derivatives are known compounds.

The coupling is appropriately carried out by gradual addition of the diazonium solution to the aqueous solution of the coupling component at a pH value of 4–6.

The pH value is advantageously adjusted by adding a buffer. Examples of possible buffers are the salts, particularly alkali metal salts, of formic acid, phosphoric acid or acetic acid. It is, furthermore, possible to add to the coupling solution wetting agents, dispersing agents or emulsifiers, for example an aralkylsulphonate, such as dodecylbenzenesulphonate, polycondensation products of ethylene oxides, such as the reaction product of ethylene oxide with p-tert.-octylphenol, and also alkyl esters of sulphoricinoleates, for example n-butyl sulphoricinoleate. The coupling dispersion can also with advantage contain protective colloids, for example methylcellulose or minor or major amounts of inert, water-miscible, organic solvents, such as acetone, methyl ethyl ketone, methanol, ethanol or isopropanol as well as dimethylformamide or N-methylpyrrolidone or pyridine.

By virtue of their insolubility it is possible to isolate the resulting pigments from the reaction mixtures by filtration. In most cases, these pigments have an excellent texture after drying. In individual cases it is found to be advantageous to after-treat the resulting pigments with an organic solvent, preferably one boiling above 100° C. Solvents which prove to be particularly suitable are benzene derivatives substituted by halogen atoms or alkyl or nitro groups, such as xylenes, chlorobenzene, o-dichlorobenzene, or nitrobenzene, and pyridine bases, such as pyridine, picoline or quinoline, and also ketones, such as cyclohexanone, ethers, such as ethylene glycol monomethyl ether or monoethyl ether, and amides, such as dimethylformamide or N-methylpyrrolidone and sulphoxone.

The after-treatment is preferably carried out by heating the pigment in the solvent to 100° – 150° C, a coarsening of grain taking place in many cases, which has a favourable influence on the fastness of the resulting pigments to light and migration.

The coupling can also be carried out with advantage by continuously combining an acid solution of the diazonium salt with an alkaline solution of the coupling component in a mixing jet, an immediate coupling of the components taking place. The resulting dispersion of dyestuff is continuously withdrawn from the mixing jet and the dyestuff is separated by filtration.

Instead of diazonium salts, it is also possible to use the corresponding diazoamino compounds. These are obtained by a known process by coupling an aryldiazonium salt with one mol of a primary amine or, preferably, a secondary amine. The most diverse amines are suitable for this purpose, for example aliphatic amines, such as methylamine, ethylamine, ethanolamine, propylamine, butylamine, hexylamine and particularly dimethylamine, diethylamine, diethanolamine, methylethanolamine dipropylamine or dibutylamine, aminoacetic acid, methylaminoacetic acid, butylaminoacetic acid, aminoethanesulphonic acid, methylaminoethanesulphonic acid, guanylethanesulphonic acid and β-aminoethylsulphuric acid, alicyclic amines, such as cyclohexylamine, N-methylcyclohexylamine and dicyclohexylamine, aromatic amines, such as 4-aminobenzoic acid, sulphanilic acid, 4-sulpho-2-aminobenzoic acid, (4-sulphophenyl)-guanidine, 4-N-methylamino-benzoic acid, 4-ethylamino-benzoic acid, 1-aminonaphthalene-4-sulphonic acid and 1-aminonaphthalene-2,4-disulphonic acid, heterocyclic amines, such as piperidine, morpholine, pyrrolidine and dihydroindole and, finally, also sodium cyanamide or dicyandiamide.

As a rule the resulting diazoamino compounds are sparingly soluble in cold water and can be separated in a crystalline form from the reaction medium, if appropriate after salting out. In many cases the moist presscakes can be used for further reaction. In individual cases it can prove expedient to dehydrate the diazomides by vacuum drying prior to the reaction.

The coupling of the diazoamino compound with the coupling component is carried out in an organic solvent, for example chlorobenzene, o-dichlorobenzene, nitrobenzene, pyridine, ethylene glycol, ethylene glycol monoethyl ether or monomethyl ether, dimethylformamide, formic acid or acetic acid. When using solvents which are miscible with water, it is not necessary to use the diazoamino compound in an anhydrous form. For example, the water-moist filter cakes can be used.

The coupling is suitably carried out in a hot acid medium, preferably at temperatures between 80° and 180° C, and generally proceeds very rapidly and completely. If neutral solvents are used, it is advantageous to add an acid, for example hydrogen chloride, sulphuric acid, formic acid or acetic acid. By virtue of their insolubility, it is possible to isolate the resulting pigments from the reaction mixture by filtration. An after-treatment with organic solvents, such as is required in the case of pigments obtained by the aqueous coupling route, is, therefore, unnecessary in most cases.

Finally, the coupling can also be accomplished by suspending the amine to be diazotised, together with the coupling component, in an organic solvent and treating the mixture with a diazotising agent, particularly an ester of nitrous acid, such as methyl, ethyl, butyl, amyl or octyl nitrite.

The new dyestuffs represent valuable pigments which can be used in a finely divided form for pigmenting high molecular organic material, for example cellulose ethers and cellulose esters, such as ethylcellulose, nitrocellulose, cellulose acetate and cellulose butyrate, natural resins or synthetic resins, such as polymerisation resins or condensation resins, for example aminoplasts, especially urea-formaldehyde and melamine-formaldehyde resins, alkyd resins, phenoplasts, polycarbonates, polyolefins, such as polystyrene, polyvinyl chloride, polyethylene and polypropylene, polyacrylonitrile, polyacrylic acid esters, polyamides, polyurethanes or polyesters, rubber, casein, silicone and silicone resins, singly or as mixtures.

The present invention, further provides a composition comprising a high molecular weight organic material and a monoazo pigment as defined herein. The composition comprises preferably 0,1–25% and more especially 0.1–5% of pigment by weight on total composition.

In this it is immaterial whether the high molecular compounds mentioned are present as plastic compositions or as melts or in the form of spinning solutions, lacquers or paints. It is found advantageous, depending on the application, to use the new pigments as toners or in the form of preparations.

By virtue of their high tinctorial strength and transparency, the new dyestuffs are particularly suitable for use in printing inks such as letterpress printing, gravure printing and offset printing. In addition they have good brilliance, very good fastness to light and migration, a high degree of resistance to alkali and good dispersibility.

In the following examples, unless otherwise specified, the parts denote parts by weight and the percentages denote percentages by weight.

EXAMPLE 1

2.42 parts of 1-amino-2-methoxy-5-benzoic acid phenylamide are diazotised in 50 parts by volume of ice water by means of 2.5 parts by volume of concentrated hydrochloric acid and 2.5 parts by volume of 4 N sodium nitrite solution. 1.28 parts of barbituric acid are separately dissolved in 100 parts by volume of dimethylformamide and 3 parts of anhydrous sodium acetate are added. The diazo solution is poured into this coupling suspension in a thin stream. The coupling takes place immediately. The mixture is stirred for a further 3 hours at room temperature and the pigment formed is then filtered off, washed with water and methyl alcohol and dried. 3.6 parts of a soft, loose, yellow powder which dyes polyvinyl chloride in a strong red-yellow shade which is fast to migration are obtained. The pigment has the formula

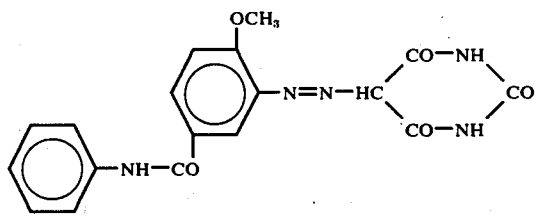

EXAMPLES 2 – 8

The table which follows lists further colorants which are obtained if the diazo compounds of the amines quoted in column I are coupled with barbituric acid according to the instructions of Example 1. Column II indicates the shade of polyvinyl chloride coloured by means of the pigment.

| | I | II |
|---|---|---|
| 2 | 1-Amino-2-methoxybenzene-5-carboxylic acid 2'-methyl-3'-chlorophenylamide | Yellow |
| 3 | 1-Amino-2-methoxybenzene-5-caboxylic acid 2'-methyl-5'-chlorophenylamide | Yellow |
| 4 | 1-Amino-2-methoxybenzene-5-carboxylic acid 2'-chloro-5'-trifluoromethylphenylamide | Yellow |
| 5 | 1-Amino-2-methoxybenzene-5-carboxylic acid 2',5'-dichloro-phenylamide | Yellow |
| 6 | 1-Amino-2-chlorobenzene-5-carboxylic acid 2',4'-dichloro-phenylamide | Greenish-tinged yellow |
| 7 | 1-Amino-2-methylbenzene-5-carboxylic acid 2'-chloro-5-trifluoromethyl-phenylamide | Greenish-tinged yellow |
| 8 | 1-Amino-2-methyl-benzene-5-carboxylic acid 2'-methoxy-phenylamide | Greenish-tinged yellow |

EXAMPLE 9

5.0 parts of 1-amino-2-methoxy-5-benzamide are dissolved at room temperature in 60 parts by volume of glacial acetic acid. The pale yellow solution is stirred with 8 parts by volume of concentrated hydrochloric acid, the resulting suspension (hydrochloride) is cooled to 5° C and 8 parts by volume of 4 N sodium nitrite solution are added dropwise at 5° C over the course of 15 minutes, and the resulting diazo solution is filtered to give a clear product.

3.85 parts of barbituric acid are then dissolved, together with 15 parts by volume of 30% strength sodium hydroxide solution, in 75 parts of water. The diazo solution is added dropwise to this colourless solution at 5° C over the course of 30 minutes. In the course thereof a yellow precipitate is formed. The pH value of the resulting suspension is adjusted to 5 by adding 45 parts by volume of 30% strength aqueous sodium hydroxide solution and the suspension is stirred for 4 hours at a temperature which rises to 20° C, and is heated to 75° C in the course of one hour and filtered hot. The residue is washed free from salt and is dried in vacuo at 60° C. 8.6 parts, corresponding to 94% of theory, are obtained of an orange-tinged yellow powder of the formula

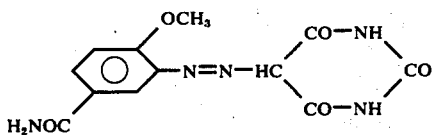

When this pigment is after-treated in dimethylformamide (2 hours at 146° C) and milled into polyvinyl chloride, fast, yellow colourations are obtained.

EXAMPLES 10 – 42

The table which follows describes further colorants which are obtained by coupling the diazotised bases of column I with the coupling components of column II. Column III indicates the colour shade of a PVC sheet coloured with 0.2% of these pigments.

| Example | I | II | III |
|---|---|---|---|
| 10 | 1-Amino-2-chloro-5-benzamide | Barbituric acid | Greenish tinged yellow |
| 11 | 1-Amino-2-methyl-5-benzamide | Barbituric acid | Greenish-tinged yellow |
| 12 | 1-Amino-2-chloro-5-dimethylbenzamide | Barbituric acid | Greenish-tinged yellow |
| 13 | 1-Amino-2-chloro-5-methylbenzamide | Barbituric acid | Greenish-tinged yellow |
| 14 | 1-Aminobenzene-4-carboxylic acid phenylamide | Barbituric acid | Greenish-tinged yellow |
| 15 | 1-Aminobenzene-4-carboxylic acid phenylamide | 2-Thiobarbituric acid | Orange-yellow |
| 16 | 1-Aminobenzene-4-carboxylic acid phenylamide | 2-Iminobarbituric acid | Greenish-tinged yellow |
| 17 | 1-Aminobenzene-4-carboxylic acid phenylamide | 2,4-Diiminobarbituric acid | Yellow |
| 18 | 1-Aminobenzene-4-carboxylic acid phenylamide | 2-Thio-4-imino-barbituric acid | Orange |
| 19 | 1-Aminobenzene-4-carboxylic acid phenylamide | 1-Phenylbarbituric acid | Greenish-tinged yellow |
| 20 | 1-Aminobenzene-4-carboxylic acid 2'-methoxy-phenylamide | Barbituric acid | Greenish-tinged yellow |
| 21 | 1-Aminobenzene-4-carboxylic acid 2',4'-dichloro-phenylamide | 2-Thiobarbituric acid | Yellow |
| 22 | 1-Aminobenzene-4-carboxylic acid 2',5'-dichloro-phenylamide | Barbituric acid | Greenish-tinged yellow |
| 23 | 1-Aminobenzene-4-carboxylic acid 2',4',5'-trichloro-phenylamide | Barbituric acid | Greenish-tinged yellow |

-continued

| Example | I | II | III |
|---|---|---|---|
| 24 | 1-Amino-2-methoxybenzene-5-carboxylic acid phenylamide | 2-Thiobarbituric acid | Orange |
| 25 | 1-Amino-2-methoxybenzene-5-carboxylic acid 2'-methoxy-phenylamide | Barbituric acid | Yellow |
| 26 | 1-Amino-2-methoxybenzene-5-carboxylic acid 2',4'-dichloro-phenylamide | Barbituric acid | Yellow |
| 27 | 1-Amino-2-methoxybenzene-5-carboxylic acid 2',4'-dichloro-phenylamide | 2-Thiobarbituric acid | Orange |
| 28 | 1-Amino-2-methoxybenzene-5-carboxylic acid 2',5'-dichloro-phenylamide | Barbituric acid | Yellow |
| 29 | 1-Amino-2-methoxybenzene-5-carboxylic acid 2',5'-dichloro-phenylamide | 2-Thiobarbituric acid | Orange |
| 30 | 1-Amino-2-methoxybenzene-5-carboxylic acid 2',4',5'-trichloro-phenylamide | Barbituric acid | Yellow |
| 31 | 1-Amino-2-methoxybenzene-5-carboxylic acid 2',4',5'-trichloro-phenylamide | 2-Thiobarbituric acid | Orange |
| 32 | 1-Amino-2-chlorobenzene-5-carboxylic acid phenylamide | Barbituric acid | Greenish-tinged yellow |
| 33 | 1-Amino-2-chlorobenzene-5-carboxylic acid 2',4'-dichloro-phenylamide | Barbituric acid | Greenish-tinged yellow |
| 34 | 1-Amino-2-chlorobenzene-5-carboxylic acid 2',4'-dichloro-phenylamide | 2-Thiobarbituric acid | Yellow |
| 35 | 1-Amino-2-chlorobenzene-5-carboxylic acid 2',5'-dichloro-phenylamide | Barbituric acid | Greenish-tinged yellow |
| 36 | 1-Amino-2-chlorobenzene-5-carboxylic acid 2',4',5'-trichloro-phenylamide | Barbituric acid | Greenish-tinged yellow |
| 37 | 1-Amino-2-chlorobenzene-5-carboxylic acid 2',4',5'-trichloro-phenylamide | 2-Thiobarbituric acid | Yellow |
| 38 | 1-Amino-2-methylbenzene-5-carboxylic acid phenylamide | Barbituric acid | Greenish-tinged yellow |
| 39 | 1-Amino-2-methylbenzene-5-carboxylic acid 2',4'-dichloro-phenylamide | Barbituric acid | Greenish-tinged yellow |
| 40 | 1-Amino-2-methylbenzene-5-carboxylic acid 2'-5'-dichloro-phenylamide | Barbituric acid | Greenish-tinged yellow |
| 41 | 1-Amino-2-methylbenzene-5-carboxylic acid 2',4',5'-trichloro-phenylamide | Barbituric acid | Greenish-tinged yellow |
| 42 | 1-Amino-2-phenoxy-5-benzamide | Barbituric acid | Yellow |

EXAMPLES 43–85

The table which follows contains colorants of the formula

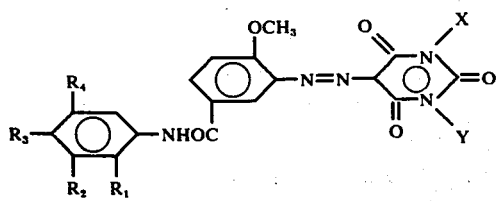

which are obtained if the diazo component of an amine of the formula is coupled, following the instructions of Example 9, with a barbituric acid of the formula

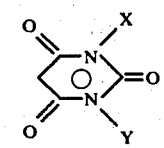

the meaning of the symbols indicated in the formulae and the colour shade of a PVC sheet coloured with 0.2% of the colorant being shown in columns 2–7.

| Example | X | Y | $R_1$ | $R_2$ | $R_3$ | $R_4$ | Colour Shade |
|---|---|---|---|---|---|---|---|
| 43 | $CH_3$ | $CH_3$ | Cl | H | Cl | Cl | Yellow |
| 44 | $CH_3$ | $CH_3$ | H | Cl | Cl | H | Yellow |
| 45 | $CH_3$ | $CH_3$ | Cl | Cl | H | H | Yellow |
| 46 | $CH_3$ | $CH_3$ | H | H | Cl | H | Yellow |
| 47 | $CH_3$ | $CH_3$ | $OCH_3$ | H | H | $SO_2C_2H_5$ | Yellow |
| 48 | $CH_3$ | $CH_3$ | CN | H | H | H | Yellow |
| 49 | $CH_3$ | $CH_3$ | H | H | H | H | Yellow |
| 50 | $CH_3$ | $CH_3$ | OH | H | H | H | Yellow |
| 51 | $CH_3$ | $CH_3$ | H | H | H | H | Yellow |
| 52 | $CH_3$ | $CH_3$ | $NO_2$ | H | H | H | Yellow |
| 53 | $C_6H_5$ | $C_6H_5$ | Cl | H | Cl | Cl | Yellow |
| 54 | $C_6H_5$ | $C_6H_5$ | H | Cl | Cl | H | Reddish-tinged yellow |
| 55 | $C_6H_5$ | $C_6H_5$ | Cl | Cl | H | H | Reddish-tinged yellow |
| 56 | $C_6H_5$ | $C_6H_5$ | H | H | Cl | H | Yellow |
| 57 | $C_6H_5$ | $C_6H_5$ | $OCH_3$ | H | H | $SO_2C_2H_5$ | Reddish-tinged yellow |
| 58 | $C_6H_5$ | $C_6H_5$ | H | H | H | H | Orange |

-continued

| Example | X | Y | $R_1$ | $R_2$ | $R_3$ | $R_4$ | Colour Shade |
|---|---|---|---|---|---|---|---|
| 59 | 3-$ClC_6H_4$ | $CH_3$ | Cl | H | Cl | Cl | Yellow |
| 60 | 3-$ClC_6H_4$ | $CH_3$ | $OCH_3$ | H | H | $SO_2C_2H_5$ | Yellow |
| 61 | 3-$ClC_6H_4$ | $CH_3$ | H | H | H | H | Yellow |
| 62 | H | $C_6H_5$ | H | H | Cl | H | Reddish-tinged yellow |
| 63 | H | $C_6H_5$ | $OCH_3$ | H | H | $SO_2C_2H_5$ | Reddish-tinged yellow |
| 64 | H | $C_6H_5$ | H | H | H | $SO_2C_2H_5$ | Reddish-tinged yellow |
| 65 | H | $C_6H_5$ | Cl | H | Cl | Cl | Reddish-tinged yellow |
| 66 | H | $CH_3$ | $OCH_3$ | H | H | $SO_2C_2H_5$ | Reddish-tinged yellow |
| 67 | H | $CH_3$ | H | Cl | Cl | H | Yellow |
| 68 | H | $CH_3$ | H | H | H | H | Reddish-tinged yellow |
| 69 | $C_2H_5$ | $CH_3$ | H | H | $CH_3$ | H | Yellow |
| 70 | H | $C_6H_5$ | $OCH_3$ | H | H | H | Yellow |
| 71 | H | $C_6H_5$ | $NO_2$ | H | H | H | Yellow |
| 72 | H | $C_6H_5$ | $CH_3$ | H | H | H | Yellow |
| 73 | $CH_3$ | $C_2H_5$ | H | H | H | $NO_2$ | Yellow |
| 74 | $CH_3$ | 3-Cl—$C_6H_4$ | $OCH_3$ | H | H | H | Yellow |
| 75 | $CH_3$ | 3-$ClC_6H_4$ | $NO_2$ | H | H | H | Yellow |
| 76 | $CH_3$ | 3-$ClC_6H_4$ | $CH_3$ | H | H | H | Yellow |
| 77 | $CH_3$ | $CH_3$ | H | H | $CH_3$ | H | Yellow |
| 78 | $CH_3$ | $CH_3$ | H | H | $OCH_3$ | H | Yellow |
| 79 | $C_6H_5$ | $C_6H_5$ | $OCH_3$ | H | H | H | Yellow |
| 80 | $C_6H_5$ | $C_6H_5$ | H | H | $NO_2$ | H | Yellow |
| 81 | $C_6H_5$ | $C_6H_5$ | $CH_3$ | H | H | H | Yellow |
| 82 | $C_2H_5$ | $C_2H_5$ | $NO_2$ | H | H | H | Yellow |
| 83 | $C_2H_5$ | $C_2H_5$ | $CH_3$ | H | H | H | Yellow |
| 84 | $C_2H_5$ | Pn | $NO_2$ | H | H | H | Yellow |
| 85 | $C_2H_5$ | Pn | $CH_3$ | H | H | H | Yellow |

EXAMPLES 86–93

The table which follows contains colorants of the formula

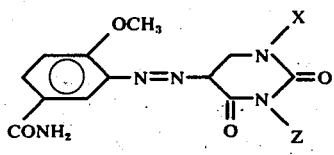

which are obtained if the diazo component of an amine of the formula

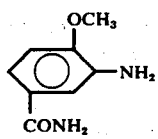

is coupled, following the instructions of Example 9, with a barbituric acid of the formula

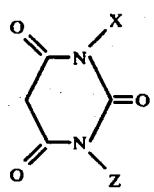

the meaning of the symbols indicated in the formulae and the colour shade of a PVC sheet coloured with 0.2% of the colorant being shown in columns 2–5.

| Example | X | Y | Colour shade |
|---|---|---|---|
| 86 | H | $C_6H_5$ | Yellow |
| 87 | $CH_3$ | $C_2H_5$ | Yellow |
| 88 | $CH_3$ | 3-$ClC_6H_4$ | Orange |
| 89 | $CH_3$ | $CH_3$ | Yellow |
| 90 | $C_6H_5$ | $C_6H_5$ | Orange |
| 91 | H | $CH_3$ | Yellow |
| 92 | H | $C_6H_5$ | Yellow |
| 93 | $C_2H_5$ | $C_2H_5$ | Yellow |

EXAMPLE 94

65 parts of stabilised polyvinyl chloride, 35 parts of dioctyl phthalate and 0.2 part of the colorant obtained according to Example 1 are stirred together and are then worked on a twinroll calender for 7 minutes at 140° C. A yellow sheet of very good fastness to light and migration is obtained.

EXAMPLE 95

1.00 g of the pigment prepared in accordance with Example 1 is finely ground on an Engelsmann grinding machine with 4.0 g of a printer's varnish composed of 29.4% of linseed oil-stand oil (300 poises), 67.2% of linseed oil-stand oil (20 poises), 2.1% of cobalt octoate (8% Co) and 1.3% of lead octoate (24% Pb), and the mixture is then printed onto art printing paper at 1 g/m² with the aid of a block, in the letterpress process. A strong, pure yellow shade of good transparency and good gloss is obtained. In the three-colour or four-colour printing process, very brilliant green shades can be produced by overprinting onto blue.

The pigment is also suitable for other printing processes, such as gravure printing, offset printing and flexographic printing, and here too gives very good results.

We claim:
1. A monoazo pigment of the formula

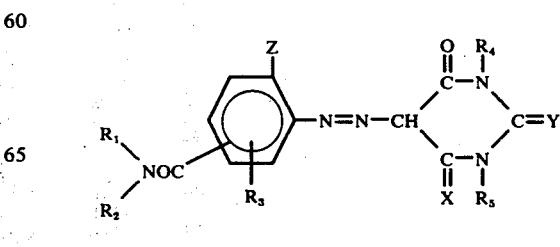

wherein $R_1$ denotes H, alkyl containing 1-4 atoms or an aryl radical of the formula

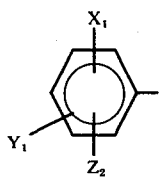

wherein $X_1$ denotes H, chloro, alkyl containing 1-4 C atoms, alkoxy containing 1-4 atoms, alkoxy carbonyl containing 2-5 C atoms, nitro, trifluoromethyl or cyano, $Y_1$ and $Z_2$ denote H, chloro or alkyl, $R_2$ denotes H, or alkyl containing 1-4 atoms, $R_3$ denotes H, chloro or alkyl containing 1-4 atoms, $R_4$ and $R_5$ denote H, alkyl contaning 1-4 C atoms, phenyl or phenyl substituted by chloro, alkyl containing 1-4 atoms or alkoxy containing 1-4 C atoms, X denotes O or imino, Y denotes O, S or imino, and Z denotes chloro, alkyl containing 1-4 C atoms, alkoxy containing 1-4 C atoms, or phenoxy, and wherein the carbonamide group is located in the m- or p-position to the azo group.

2. A monoazo pigment according to claim 1 of the formula

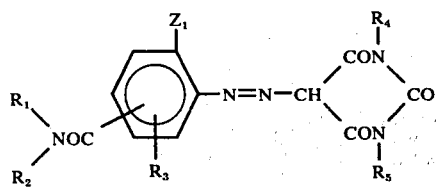

wherein $R_1$, $R_2$, $R_3$, $R_4$ and $R_5$ have the meaning indicated in claim 1, and $Z_1$ denotes chloro, alkyl containing 1-4 C atoms, alkoxy containing 1-4 C atoms, phenoxy phenoxy substituted by chloro, alkyl, containing 1-4 atoms or alkoxy containing 1-4 C atoms.

3. A monoazo pigment according to claim 2 of the formula

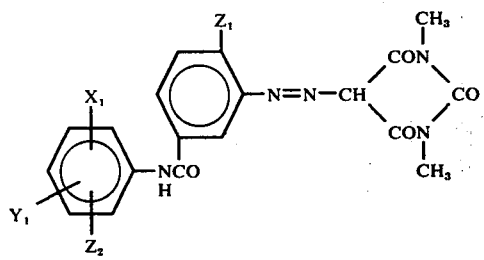

wherein $Z_1$ has the meaning indicated in claim 2, $X_1$ denotes H chloro, alkyl containing 1-4 C atoms, alkoxy containing 1-4 C atoms, alkoxycarbonyl containing 2-5 C atoms, nitro, trifluoromethyl or cyano, and $Y_1$ and $Z_2$ denote H chloro or alkyl.

4. A monoazo pigment according to claim 3, wherein $Z_1$ denotes alkoxy containing 1-4 C atoms.

5. The compound according to claim 1, of the formula

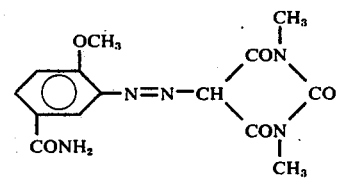

6. The compound according to claim 1, of the formula

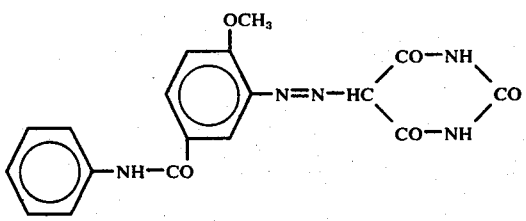

7. The compound according to claim 1, of the formula

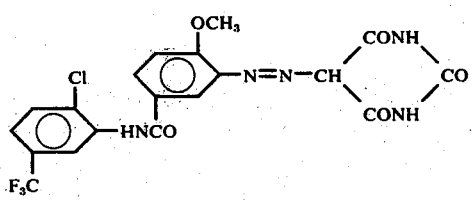

8. The compound according to claim 1, of the formula

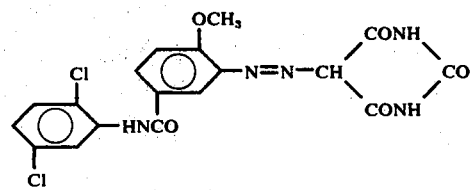

9. The compound according to claim 1, of the formula

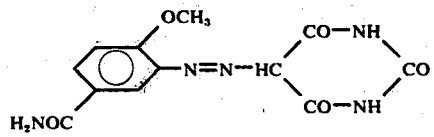

* * * * *